Aug. 27, 1940.  R. J. McNITT  2,213,073
FURNACE ELECTRODE
Filed Oct. 21, 1937
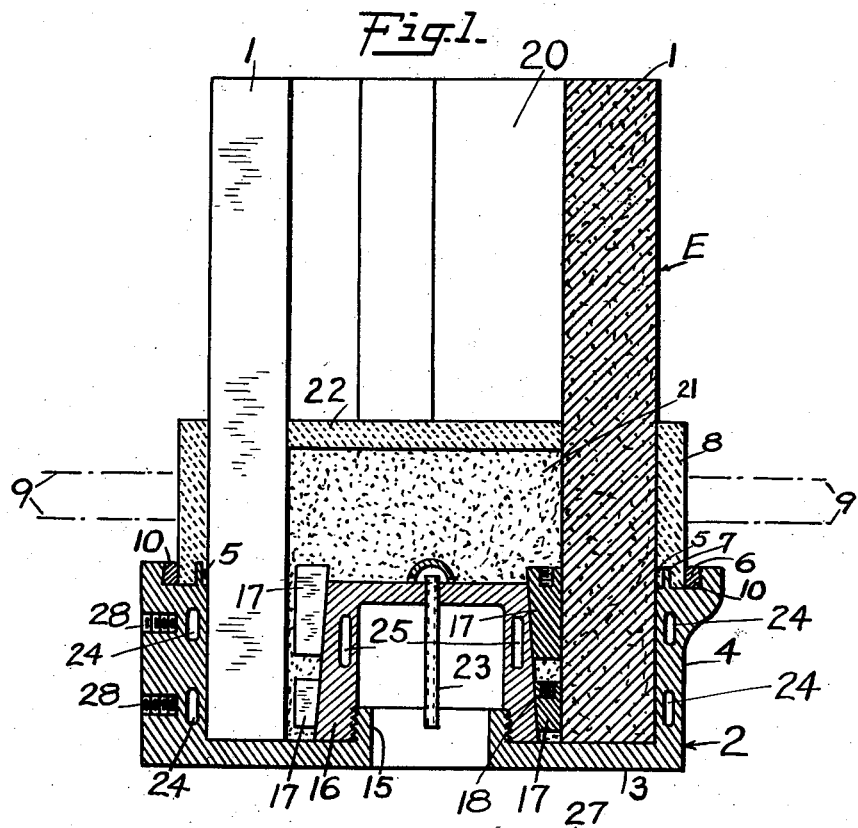
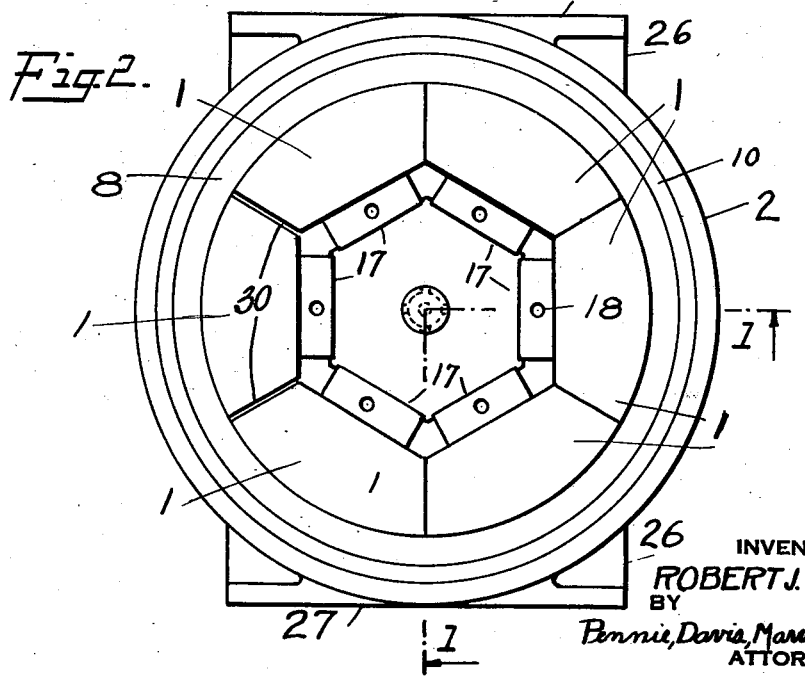
INVENTOR
ROBERT J. McNITT
BY
Pennie, Davis, Marvin & Edmonds
ATTORNEYS Patented Aug. 27, 1940

2,213,073

UNITED STATES PATENT OFFICE 2,213,073

FURNACE ELECTRODE

Robert J. McNitt, Perth Amboy, N. J.

Application October 21, 1937, Serial No. 170,141

7 Claims. (Cl. 204—19)

This invention relates to an improved electrode for use in the electrolysis of fused baths in the production of the light metals such, for example, as sodium. The electrode of the invention comprises a composite carbon or graphite element formed of a plurality of elongated pieces of carbon or graphite which are grouped together and held or supported in a suitable metal structure. The plurality of carbon pieces, which may be of any suitable cross-sectional form, are grouped together and held tightly as a single current carrying and bath contacting entity. The construction and arrangement of the composite carbon element and the means of contacting and supporting the separate pieces thereof are such as to ensure uniform current distribution throughout the composite element.

The invention has for an object an electrode, the construction of which affords a large surface for contacting the fused bath, with an accompanying low capacity to transmit heat from the bath through the electrode to the outside.

The invention aims to provide means for sealing the composite carbon element in the holder to prevent contact of the carbon with oxidizing gases and resulting destructive notching of the carbon. The invention provides means in combination with the composite carbon element and the holder, for the exclusion of air or other oxidizing gases from those surfaces of carbon which are not in contact with and protected from oxidation by the fused bath, and means for suppressing or diminishing the flow of heat from the fused bath through the electrode to the outside.

These and other features of the invention will be better understood after considering the following discussion taken in conjunction with the accompanying drawing, in which Fig. 1 is a vertical sectional view taken along the line 1—1 of Fig. 2; and Fig. 2 is a plan view of an electrode, with parts omitted, of an electrode constructed in accordance with the invention.

The electrode illustrated in the drawing comprises a composite carbon or graphite element E which is made of a plurality of elongated pieces of carbon or graphite 1, of any suitable cross-sectional form, grouped together and mounted at the lower ends thereof in a metal supporting structure or holder 2 which may be formed of cast iron or any suitable metal. Hereinafter the electrode element E and pieces of which it is formed will be referred to merely as carbon. The particular form or shape of the carbon pieces 1 and the composite element E are merely illustrative. It is to be understood that while an element having a circular exterior and hexagonal interior, in cross-section, is shown for illustrative purposes, an element in accordance with the invention may also be in any suitable cross-sectional form and include any number of carbon pieces. The composite element may, for example, be formed of a plurality of square segments which are mounted in a row, thus forming a composite element which is relatively wide and narrow in cross-section.

The carbon pieces 1, especially where they join one against the other, may fit closely together or loosely as indicated by spaces 30 in Fig. 2, which provide passageways between the inside and the outside of the carbon element. The metal holder 2, as shown, is an annular structure having a flat base 3 and upwardly extending sides 4 which preferably flare outwardly at the upper edge in which is formed a recess 5 and a groove 6, the recess and groove being separated by a web 7. A refractory sleeve or jacket 8 covers the exterior surface of the carbon element E and engages the side 4 in contact with the recess and groove 6. The sleeve may be formed of any suitable refractory material such as magnesite, silica, fire clay, and the like.

The electrode as shown in Fig. 1 is inserted through the bottom of a furnace, the broken lines 9 indicating the bottom. The upper end of the carbon element E is in the furnace bath and the refractory sleeve 8 projects into the furnace and is in contact with the charge. The sleeve 8 may be molded and baked and then filled over and cemented to the carbon element and the holder 2, or it may be molded over the carbon element and baked in position.

The refractory material fills the recess 5, envelopes the web 7, and partially fills the groove 6, thereby leaving a space in the groove for filling with a suitable sealing material, for example, molten lead 10. The particular manner of joining the refractory material in the recess and groove, coupled with the use of the lead seal prevents the infiltration of air or other oxidizing gases into the space between the holder 2 and the carbon element and also between the carbon element and the refractory sleeve.

The holder 2 is preferably open at the center and has an inwardly projecting threaded portion 15 to which is screw connected a central supporting member 16 which is also formed of metal. The exterior surface of the inner member 16 conforms to the inner configuration of the composite carbon element E and as shown in the drawing is hexagonal. While the inner surfaces of the electrode are parallel, the opposite inner surfaces of the inner member 16 converge at a very slight angle and thereby make possible the application of wedges 17 for securing the lower ends of the carbon pieces 1 in position in the holder 2. These wedges may be made of metal such as brass or steel, or they may even be formed of graphite or carbon. As shown in Fig. 1, they are preferably formed in two sections which are spaced apart and thereby exert positive pressure throughout the length of the carbon in contact with the holder 2. As a means of convenience in removing the wedges, a tap-hole 18 is provided in each wedge for screwing in an I-bolt or the like.

The lower portion of the central opening 20 within the carbon element E and immediately above the central element 16 and the interstices between the wedges 17 and the carbon pieces 1 or the central element 16, is packed with a refractory material 21 having lower heat conductivity than graphite such, for example, as granular carbon, infusorial earth, or sintered magnesia. The preferred manner of employing the heat insulating material 21 is to pack the interstices between the wedges, the carbon pieces, and the central element 16 with pulverulent carbon. The space above the wedges 17 and the central element 16 are then packed with one of the heat insulating mediums just mentioned. The portion of the insulating medium in immediate contact with the carbon pieces may consist of pulverulent carbon. The upper surface of the insulating medium 21 extends into the furnace above the bottom and is covered with a buffer which is generally formed of solid refractory material 22. This refractory material 22 is in direct contact with the furnace charge and accordingly prevents destruction or deterioration of the insulating material.

The inner member 16 has an opening adjacent its center in which is inserted a pipe 23 which connects to any suitable source of inert gas under pressure such as nitrogen. Preliminary to the use of the electrode, the inert gas under pressure is admitted through pipe 23 where it fills all of the spaces in the interstices and between the various carbon pieces and the wedges, thereby driving out of these spaces any entrapped oxidizing gas that may have been there and serving as a means of excluding the ingress of such oxidizing gases during the use of the electrode. The precautionary means just described for safeguarding the electrode from oxidation may be accomplished by subjecting the entire electrode to a suitable reduced pressure, thereby removing the gas and then filling the spaces with inert gas.

The holder 2 may be prevented from excessive heating by the circulation of a suitable cooling medium, for example water through ducts 24, which are formed in the casting. Similarly, the overheating may be prevented by the use of exterior webs or fins which may remove the heat by the circulation of air, or by encircling the holder with coils in which a cooling medium is circulated. The inner member 16 is also preferably provided with a duct 25 for the circulation of a suitable cooling medium such as water or air.

In the particular form of electrode illustrated in the drawing wherein the sides 4 are cylindrical, it is advisable to provide extensions or projections 26, preferably diametrically positioned on the exterior and having large flat surfaces 27 for attaching thereto electrical conductors such as cables or buss bars (not shown). These cables or buss bars may be bolted against the flat surface 27 by bolts which are inserted in the tap-holes 28.

The electrode of the invention is particularly suitable for use in electrolytic furnaces such as are now used in the reduction of alkali metals and, as illustrated, is highly satisfactory as a bottom electrode and may be used in different types of bottom electrode furnaces, one of which, for example, is the furnace shown in the United States patent to Downs, No. 1,501,756.

While the carbon pieces 1 have been described as being held together and in firm contact with the holder 2 by a plurality of wedges, it is to be understood that other means of accomplishing this purpose may be resorted to. For example, they may be secured to the contact surfaces of the holder by bolts or screws, or they may be held rigidly in place and in good electrical contact by being surrounded with metal. This may be done by casting the carbon pieces in the holder in a molten metal, for example, in molten lead.

I claim:

1. An electrode for the electrolysis of molten baths which comprises a composite carbon element formed of a plurality of carbon pieces and having a hollow center, a metal holder in which one end of the carbon element is mounted, means for establishing and maintaining all of the carbon pieces in uniform engagement with the holder, a refractory sleeve surrounding a portion of the carbon element in contact therewith and in engagement with the holder, one end of the carbon element and a part of the refractory sleeve being arranged to be inserted into the bath, means for sealing the place of contact of the refractory sleeve and the holder to suppress the passage of gas therebetween, a closure of insulating material in the hollow center of the carbon element adjacent the holder for suppressing the flow of heat from the charge through the electrode, the opposite end of the carbon element being open to the hollow center, and means to connect the holder to a source of electric current.

2. An electrode for the electrolysis of molten baths which comprises a composite carbon element formed of a plurality of carbon pieces and having a hollow center, a metal holder having a bottom and upright sides in which the separate pieces of carbon are nested, one end of each carbon piece being in engagement with the bottom, means in engagement with the bottom and inside the hollow center for securing and maintaining the pieces of carbon into tight uniform engagement with the said sides of the holder, a refractory sleeve surrounding the carbon element and in intimate engagement with the element and the holder, one end of the carbon element and a part of the refractory sleeve being arranged to be inserted into the bath, insulating means in the hollow center adjacent the holder to suppress the flow of heat from the charge through the electrode, and means for attaching an electrical conductor to the holder.

3. An electrode for the electrolysis of molten baths adapted to be inserted upwardly through the bottom of an electrolytic furnace which comprises a carbon element having a central opening, a holder in which one end portion of the carbon element is mounted, a refractory sleeve surrounding a part of the carbon element and in contact with the holder, means for sealing the refractory sleeve where it contacts with the holder, refractory means in the central opening of the carbon element to prevent the passage of charged material through the central opening, and at least one opening through that portion of the carbon element above the refractory sleeve and the refractory means providing a passageway between the central opening and the outside of the carbon element.

4. An electrode for the electrolysis of molten baths which comprises a composite carbon element formed of a plurality of carbon pieces, a metal holder in which one end portion of the carbon element is mounted, means for establishing and maintaining all of the carbon pieces in the holder in uniform engagement with the holder, the opposite end portion of the carbon element being adapted to be inserted into the molten bath, a refractory protecting sleeve around the carbon element and forming a tight contact with the holder substantially preventing a flow of gas between the sleeve and the holder, said refractory sleeve being arranged to cover the exposed carbon between the holder and the bath and to extend into the bath, and means for connecting the holder to a source of electric current.

5. An electrode for the electrolysis of molten baths which comprises a composite carbon element formed of a plurality of carbon pieces, a metal holder in which one end portion of the carbon element is mounted, means in engagement with the holder and with the carbon pieces for establishing and maintaining all of the carbon pieces in uniform engagement with the holder, a refractory sleeve surrounding a portion of the carbon element adjacent the holder, said electrode being constructed and arranged to be inserted into a furnace with one end portion of the carbon element and a part of the refractory sleeve in contact with the bath and the holder and a part of the refractory sleeve outside the bath, a fusible sealing means in engagement with the refractory sleeve and the holder preventing a flow of gas between the holder and the refractory sleeve, and means for attaching the holder to a source of electric current.

6. An electrode for the electrolysis of molten baths adapted to be inserted upwardly through the bottom of an electrolytic furnace which comprises a composite carbon electrode formed of a plurality of carbon pieces, a metal holder having a recess in which the end of the carbon electrode is mounted, said carbon electrode being open at the center, means in contact with the holder and with the carbon pieces for establishing and maintaining all of the carbon pieces in uniform electrical contact with the holder, a refractory sleeve surrounding the carbon electrode and arranged to extend from the holder into the bath to prevent air contacting the exterior portion of the carbon electrode which does not enter the bath, a non-oxidizing atmosphere in the interstices within the electrode between the lower level of the bath and the holder recess, a solid material packed into the opening in the carbon electrode between the holder and the bath to suppress the flow of heat from the bath into the holder, and means for connecting the holder to a source of electrical current.

7. An electrode for the electrolysis of molten baths adapted to be inserted upwardly through the bottom of an electrolytic furnace which comprises a composite carbon electrode formed of a plurality of carbon pieces, a metal holder having a recess in which the end of the carbon electrode is mounted, said carbon electrode being open at the center, means for securing the carbon pieces in uniform contact with the holder, the upper end of the carbon electrode being constructed to be inserted into the bath and the holder and a portion of the electrode being constructed to remain outside the bath, a refractory sleeve surrounding that exterior part of the electrode constructed to remain outside the bath, means for sealing the space between the refractory sleeve and the holder to prevent a flow of gas between the refractory sleeve and the holder, a solid material packed into the opening in the carbon electrode between the lower level of the bath and the holder to suppress the flow of heat into the holder, the bath normally filling the said opening in the electrode and resting on the solid material, a space between one or more of the carbon pieces permitting the molten bath to circulate therethrough from the opening in the electrode to the other part of the bath, and means for connecting the holder to a source of electric current.

ROBERT J. McNITT.